United States Patent [19]
Wenstrand et al.

[11] Patent Number: 5,544,299
[45] Date of Patent: Aug. 6, 1996

[54] METHOD FOR FOCUS GROUP CONTROL IN A GRAPHICAL USER INTERFACE

[76] Inventors: John S. Wenstrand, 35 Rondo Way, Menlo Park, Calif. 94025; Thomas W. Ekstedt, 159 Ruby Dr., San Carlos, Calif. 94070

[21] Appl. No.: 236,313

[22] Filed: May 2, 1994

[51] Int. Cl.$^6$ ................................................. G06F 3/14
[52] U.S. Cl. ........................ 395/155; 395/156; 395/157
[58] Field of Search ................................. 395/155, 156, 395/157, 129, 600, 650; 364/282.1, 283.2, 282.2, 412; 348/2, 13

[56] References Cited

U.S. PATENT DOCUMENTS

| 5,206,950 | 4/1993 | Geary et al. | 395/600 |
| 5,226,117 | 7/1993 | Miklos | 395/157 |
| 5,241,624 | 8/1993 | Torres | 395/129 |
| 5,309,555 | 5/1994 | Akins et al. | 395/157 |
| 5,404,509 | 4/1995 | Klein | 395/600 |

OTHER PUBLICATIONS

Douglas A. Young, "The X Window System Programming and Applications with Xt OSF/Motif Edition—The Motif Widget Classes", 1990 by Prentice Hall, Inc., pp. 109–112.

"Consistent Behavior Through Consistent Operational Models", Open Software Foundation, OSF/Motif, Style Guide, 1990, Prentice Hall, pp. 2-1<2-21.

*Primary Examiner*—Raymond J. Bayerl
*Assistant Examiner*—Ruay Lian Ho

[57] ABSTRACT

A method of operating a computer having a graphical display device to allow a user to input data. The user is provided with an entry focus group and one or more secondary focus groups, no more than one of the focus groups being active at any given time. Each focus group has one or more data entry fields. At any given time, the user is restricted to the data entry fields in the currently active focus group. Initially, the entry focus group is active. The program accepts data entered by the user into at least one of the data entry fields in the entry focus group. One of the secondary focus groups is caused to become active in response to the user entering data into a predetermined one of the data entry fields in the entry focus group. In one embodiment of the present invention, the user is provided with at least two secondary focus groups. The secondary focus groups that becomes active is determined by examining the data entered in at least one of the data entry fields in the entry focus group.

4 Claims, 1 Drawing Sheet

METHOD FOR FOCUS GROUP CONTROL IN A GRAPHICAL USER INTERFACE

FIELD OF THE INVENTION

The present invention relates to computers, and more particularly, to an improved method for controlling focus groups in a graphical user interface.

BACKGROUND OF THE INVENTION

In a computer system using a graphical user interface (GUI), the user is presented with a "focus" group which is an area displayed on the screen which will receive input from the computer keyboard. The focus group is typically delineated in some manner to set it off from the remainder of the screen. The focus group normally includes a plurality of data entry fields. The user of an application program must typically navigate through a number of fields in the focus group by pointing to the next field using a pointing device such as a mouse or by cycling through the fields by repetitively pressing a predetermined key such as tab or an arrow key.

Focus groups serve a number of purposes. By grouping the data entry fields into a focus group, the user's concept of the logical grouping of data entry fields is reinforced. This improves the understandability of the data entry process. In addition, focus groups reduce the possibility of data entry errors by rotating the focus through fields in an appropriate order. Focus groups also help the novice user learn the usual dam entry sequence by leading the user through the most typical data entry sequence.

As data entry tasks become more complex, the need for multiple focus groups becomes evident. At best, GUI systems provide a provision for multiple "windows" in which each window can contain a focus group. However, to move between focus groups, the user must change active windows. The manner in which the user cycles through windows is poorly standardized; hence, the user must learn different key strokes for different data entry tasks. In addition, the user must take the time to navigate to the correct window. If a large number of windows are active, many keystrokes may be needed to perform the required navigation. Furthermore, if the user inadvertently transfers to the wrong window and starts to type, input errors can occur.

Broadly, it is the object of the present invention to provide an improved GUI.

It is a further object of the present invention to provide a GUI having multiple focus groups.

These and other objects of the present invention will become apparent to those skilled in the art from the following detailed description of the invention and the accompanying drawings.

SUMMARY OF THE INVENTION

The present invention is a method of operating a computer having a graphical display device to allow a user thereof to input data. The user is provided with an entry focus group and one or more secondary focus groups, no more than one of the focus group:; being active at any given time. Each focus group has one or more data entry fields. At any given time, the user is restricted to the data entry fields in the currently active focus group. Initially, the entry focus group is active. The program accepts data entered by the user into at least one of the data entry fields in the entry focus group. One of the secondary focus groups is caused to become active in response to the user entering data into a predetermined one of the data entry fields in the entry focus group. In one embodiment of the present invention, the user is provided with at least two secondary focus groups. The secondary focus group s that become active is determined by examining the data entered in at least one of the data entry fields in the entry focus group.

DETAILED DESCRIPTION OF THE INVENTION

Figure 1:
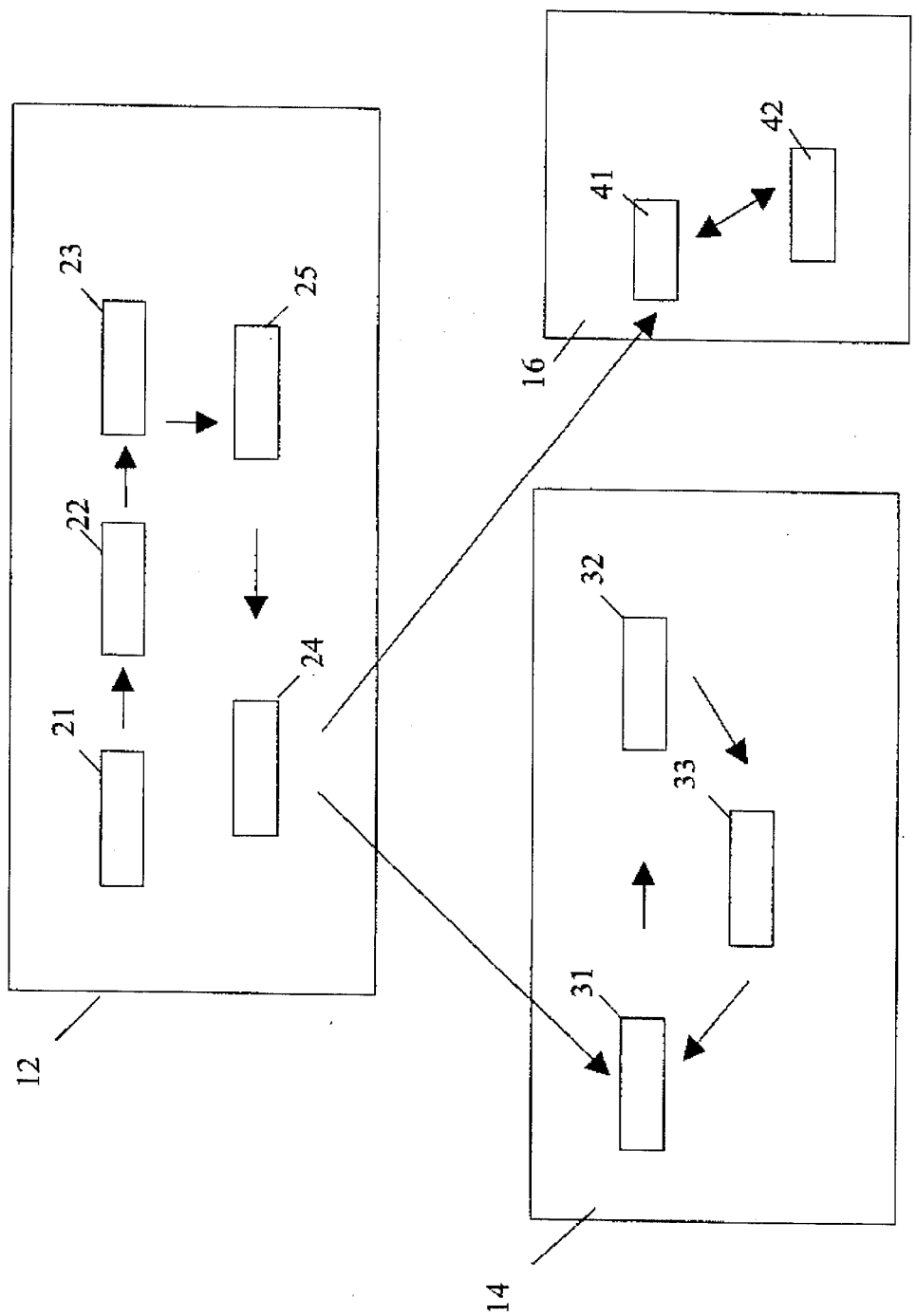
FIG. 1 illustrates a screen display having multiple focus groups according to the present invention.

The present invention is directed to a method of controlling the transitions between multiple focus groups in a GUI having a plurality of focus groups displayed thereon. For the purposes of the present discussion, a focus group is defined to be a plurality of data entry fields which are set-off in some manner on the computer screen. Data is entered into each field by the user. The data entry fields have a defined order. At any given time, only one data entry field is active. When the user finishes typing data into the currently active data entry field, the user types a carriage return or some other predefined key which causes the program to move to the, next data entry field in the current focus group. In prior art systems, the user needed to manually move out of the focus group when the user is finished typing the data that is to be input through the current focus group. Such manual transistor out of a focus group is also possible in the present invention; however, the present invention also provides programmed transitions out of the current focus group to another focus group or some other point in the program.

The transition between focus groups is different from so called "modal dialogs" in which the user is presented with a new window that contains information needed to deal with exceptions such as I/O errors. In modal dialogs, the user is forced to deal with the exception before proceeding. Upon completion of the dialog, the user is usually returned to the point in the program at which the modal dialog was initiated or to some predetermined error exit from the program. Hence, the definition of focus group used in the present discussion is specifically limited to non-modal dialog windows.

In contrast to a modal dialog window, the user can always override a transition between focus groups. The override may be accomplished by pressing a particular key or by printing to the desired focus group with a pointing device such as a mouse.

Refer now to FIG. 1 which illustrates a user screen having three focus groups 12, 14, and 16. Each focus group is a window having a plurality of data entry fields. Focus group 12 includes data entry fields 21–25; focus group 14 includes data entry fields 31–33, and focus group 16 includes data entry fields 41 and 42. Within any given focus group, the user moves from field to field by typing a predetermined key such as tab or by pointing to the next field using a pointing device such as a mouse.

A data entry program according to the present invention includes an entry focus group and one or more secondary focus groups. The user is placed in the entry focus group upon entering the data entry sequence. When the user finishes entering data into a predetermined data field, a program according to the present invention automatically switches focus groups. A data entry field of this type will be referred to as an exit data field. Data entry field 24 is an exit data field. In programs with more than two focus groups, the next focus group may be determined by the data entered by the user in the exit data field and/or one or more of the data fields in the focus group containing the exit data field. Alternatively, the act of moving out of the exit data field, even if no data was entered, may be used to trigger the transition to the next focus group. Such movement may be initiated by depressing a predetermined key or by the expiration of a timer that is initialized upon entry to the exit data field. Hence, arrows leading to both focus groups 14 and 16 from data entry field 24 are shown in FIG. 1. The entry focus group always has an exit data field. Exit data fields are optional in the secondary focus groups.

Once the program switches to the next focus group, the user is prevented from entering data into the data entry fields of the previous focus group. Once again, the user may move from data entry field to data entry field in the new focus group by typing a predetermined key or using the pointing device.

In the preferred embodiment of the present invention, the user can return to a previous focus group by using a special function key or pointing to the group using a pointing device such as a mouse. However, absent forcing the focus back to a previous focus group, the user will remain in the current focus group until the user exits via the exit data field.

The new focus group may or may not have an exit data field. For example, focus groups 14 and 16 do not have an exit data field. If a focus group does not have an exit data field, the user cycles between the various data entry fields until the user takes some other action that causes the program to leave the focus group. For example, the user may select an item from a pull down menu or depress some predetermined key such as one of the function keys to leave the focus group.

In the preferred embodiment of the present invention, each focus group has a predetermined entry data field. When the program places the user in a focus group, this is the first data field to be active upon entering the focus group. However, embodiments in which the user picks the first data field on entering the focus group will also be apparent to those skilled in the art. In the preferred embodiment of the present invention, a user who enters a focus group by picking the focus group using ::he above-described function key or by pointing to the focus group with a pointing device may pick the starting data field. However, when the user enters a focus group under program control, the user is placed in the entry data field.

While the above embodiments of the present invention have been described in terms of shifting focus groups based on the data entered by the user in one or more fields of the previously visited focus groups, it will be apparent to those skilled in the art that, in general, the decision may be made based on other state parameters of the computer system. For example, the decision may depend on whether or not a particular file has been read into the machine at the beginning of the data entry process. If file has not been read, the next focus group might elicit information requesting the name of a file or the information that would have been obtained from the, file in question.

The focus group arrangement of the present invention provides a number of advantages over primer art systems. In the preferred embodiment of the present invention, the data to be entered is divided into a number of focus groups that are logically related to the data entry task. Each focus group is ordered; hence, even the novice user quickly learns the typical data entry sequence. In addition, the grouping of the data fields into logical groups helps the user to understand the relationships between the various data fields. Further, by restricting the sequencing through focus groups, the present invention eliminates errors that occur in prior art systems when the user inadvertently switches to the wrong window in a multi-window program and begins typing without realizing that he or she is in the wrong window.

Various modifications to the present invention will become apparent to those skilled in the art from the foregoing description and accompanying drawings. Accordingly, the present invention is to be limited solely by the scope of the following claims.

What is claimed is:

1. A method of operating a computer having a display device to allow a user thereof to input data thereto, said method comprising the steps of:

providing said user with an entry focus group and one or more secondary focus groups, no more than one of said focus groups being active at any given time, each said focus group having one or more data entry fields, said user moving between said data entry fields in the currently active said focus group by typing a predetermined key;

causing said entry focus group to initially be active and displayed;

accepting input entered by said user into at least one of said data entry fields in said entry focus group; and causing one of said secondary focus groups to become active in response to said user moving out of an exit data entry field, whether or not said user entered data in said exit data entry field, wherein said exit data entry field is one of said data entry fields in said entry focus group.

2. The method of claim 1 wherein said user is provided with at least two secondary focus groups and said step of causing one of said secondary focus groups to become active includes the step of examining the data entered in at least one of said data entry fields in said entry focus group and selecting said secondary focus group based on said entered data.

3. The method of claim 1 further comprising the steps of initializing a timer in response to entering said exit data entry field; and moving out of said data entry field after a predetermined time has elapsed if said user has not moved out of said exit data entry field prior to said predetermined time having elapsed.

4. The method of claim 1 wherein said secondary focus group that becomes active in response to said user moving out of said exit data entry field depends on the data stored in said computer at the time said user moves out of said exit data entry field.

\* \* \* \* \*